(12) United States Patent
Won (10) Patent No.: US 7,825,910 B2
(45) Date of Patent: Nov. 2, 2010

(54) TOUCHPAD INCLUDING NON-OVERLAPPING SENSORS

(75) Inventor: Jong Sung Won, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 932 days.

(21) Appl. No.: 11/670,617

(22) Filed: Feb. 2, 2007

(65) Prior Publication Data

US 2007/0291013 A1 Dec. 20, 2007

(30) Foreign Application Priority Data

Jun. 20, 2006 (KR) .................. 10-2006-0055184

(51) Int. Cl.
*G09G 5/00* (2006.01)
(52) U.S. Cl. ..................................... 345/173
(58) Field of Classification Search ............... 345/173, 345/174, 175; 178/18.01–18.09
See application file for complete search history.

(56) References Cited

U.S. PATENT DOCUMENTS

| 7,466,307 | B2 * | 12/2008 | Trent et al. ................. 345/173 |
| 2004/0125087 | A1 | 7/2004 | Taylor | |
| 2005/0110768 | A1 | 5/2005 | Marriott | |
| 2005/0156881 | A1 * | 7/2005 | Trent et al. ................. 345/157 |
| 2006/0202971 | A1 * | 9/2006 | Kaliher ....................... 345/173 |

FOREIGN PATENT DOCUMENTS

| JP | 2005522797 | 7/2005 |
| KR | 10-20040048942 | 6/2004 |
| WO | WO 91/03782 | 3/1991 |
| WO | WO0042628 A1 | 7/2000 |
| WO | WO 2005/008444 A2 | 1/2005 |

OTHER PUBLICATIONS

European Search Report dated Nov. 5, 2007, Application No. 07110577.9-2212, 7 pages.
European Office Action dated May 3, 2010 for Application No. 07110577.9, 6 pages.

* cited by examiner

*Primary Examiner*—Richard Hjerpe
*Assistant Examiner*—Tom V Sheng
(74) *Attorney, Agent, or Firm*—Fish & Richardson P.C.

(57) ABSTRACT

A touchpad in which a user input is received includes at least first through third zones, with the first zone and the third zone being non-adjacent. The touchpad further includes at least first and second non-overlapping sensors, with the first sensor disposed in at least a portion of the first and the second zones and configured to transmit a first electrical signal in response to a user input, and the second sensor disposed in at least a portion of the first and the third zones and configured to transmit a second electrical signal in response to a user input. Moreover, the touchpad includes a controller configured to generate first information in response to receiving the first electrical signal but not the second electrical signal, second information in response to receiving both the first electrical signal and the second electrical signal, and third information in response to receiving the second electrical signal but not the first electrical signal. The first information, the second information, and/or the third information are output.

35 Claims, 10 Drawing Sheets

TOUCHPAD INCLUDING NON-OVERLAPPING SENSORS

CROSS-REFERENCE TO RELATED APPLICATION

This application claims priority to Korean Patent Application No. 10-2006-0055184, filed on Jun. 20, 2006, which is incorporated herein by reference.

BACKGROUND

1. Field

This disclosure generally relates to a touchpad, and one particular implementation relates to a device configured to output N+1 information signals using N non-overlapping sensors.

2. Description of the Related Art

Conventional data storage devices are becoming smaller, slimmer, and lighter, due in part to advances in the digital technology, semiconductor, display, storage medium, and battery fields. Example data storage devices which have been successfully commercialized include Personal Digital Assistants ("PDAs"), electronic notepads, Moving Picture Experts Group-1 ("MPEG") audio layer-3 ("MP3") players, Portable Multimedia Players ("PMPs"), game machines, and digital cameras.

SUMMARY

According to one general implementation, a device includes a touchpad including at least first through third zones, the first zone and the third zone being non-adjacent. The device also includes at least first and second non-overlapping sensors, with the first sensor disposed in at least a portion of the first and second zones and configured to transmit a first electrical signal in response to a user input, and the second sensor disposed in at least a portion of the second and third zones and configured to transmit a second electrical signal in response to a user input. Furthermore, the device includes a controller configured to generate first information in response to receiving the first electrical signal but not the second electrical signal, second information in response to receiving both the first electrical signal and the second electrical signal, and third information in response to receiving the second electrical signal but not the first electrical signal.

Implementations may include one or more of the following features. For example, the first zone and the second zone may be adjacent. The sensors may be capacitive sensors or resistive sensors. The zones may be associated with a media player function. The electrical signals may be indicative of movement in a Cartesian coordinate system or a polar coordinate system. The first sensor and the second sensor may be separated by a boundary in the second zone, where the boundary may be a saw-tooth shaped boundary at least 0.2 millimeters wide. The device may further include fourth through seventeenth zones. The touchpad may be round, square, or elliptical, and the second zone may be in a center region of the touchpad. The first information may correspond to a function associated with the first zone, the second information may correspond to a function associated with the second zone, and the third information may correspond to a function associated with the third zone. The user input may include a finger touch.

According to another general implementation, a device includes a touchpad having a circular shape and including a center zone and at least first through fourth zones formed around the center zone, where the first zone and the second zone are non-adjacent. The device further includes at least first and second non-overlapping sensors, where the first sensor is disposed in at least a portion of the first zone and the center zone and configured to transmit a first electrical signal in response to a user input, and the second sensor is disposed in at least a portion of the second zone and the center zone and configured to transmit a second electrical signal in response to a user input. Moreover, the device includes a controller configured to detect the user input and to generate first information in response to receiving the first electrical signal but not the second electrical signal, second information in response to receiving both the first electrical signal and the second electrical signal, and third information in response to receiving the second electrical signal but not the first electrical signal.

Implementations may include one or more of the following features. For example, the touchpad may be further surrounded by an outer touchpad having a circular shape, and the outer touchpad may include at least fifth through eight zones, with, for example, the fifth and sixth zones being non-adjacent. The device may further include third and fourth non-overlapping sensors, where the third sensor may be disposed in at least a portion of the fifth zone and the center zone and may be configured to transmit a third electrical signal in response to user input, and the fourth sensor may be disposed in at least a portion of the sixth zone and the center zone and may be configured to transmit a fourth electrical signal in response to user input. The controller may be further configured to generate fourth information in response to receiving the third electrical signal but not the fourth electrical signal, fifth information in response to receiving both the third electrical signal and the fourth electrical signal, and sixth information in response to receiving the fourth electrical signal but not the third electrical signal. The third zone and the fourth zone may be associated with a media player function.

Furthermore, the first zone and the second zone may be based on a polar coordinate system and include radial input areas for processing input from a radial motion of the user input. The first zone and the second zone may be based on a polar coordinate system and include angular input areas for processing input from a swirl motion of the user input. The first zone and the second zone may be associated with a cursor acceleration or scrolling function. The user input may include rotation of an input tool on a surface of the first touchpad in a clockwise or a counterclockwise direction, or the user input may include a finger touch. The first information may be a menu manipulation signal, a navigation signal, or an audio signal. The central zone may be a button which is part of the touchpad and indistinct from the touchpad. The first sensor and the second sensor may be separated by a boundary in the center zone as may the third sensor and the fourth sensor. The boundary may be a saw-tooth shaped boundary.

According to another general implementation, a method includes receiving a user input on a touchpad, the touchpad including at least first through third zones, the first zone and the third zone being not adjacent. The touchpad further includes at least first and second non-overlapping sensors, with the first sensor disposed in at least a portion of the first and the second zones and configured to transmit a first electrical signal in response to a user input, and the second sensor disposed in at least a portion of the first and the third zones and configured to transmit a second electrical signal in response to the user input. Moreover, the touchpad includes a controller configured to generate first information in response to receiving the first electrical signal but not the second electrical signal, second information in response to receiving both the first electrical signal and the second electrical signal, and third information in response to receiving the second electrical signal but not the first electrical signal. The method further includes outputting the first information, the second information, and/or the third information.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Data storage devices receive commands from users via controls on input units, such as keyboard keys or mouse buttons. Based upon one or more input unit controls being selected, these commands may activate data storage device functions, such as an item selecting function, a value setting function, or a selected item enabling function. Since mechanical buttons are bulky and malfunction over time, data storage devices may also use a touchpad to receive commands. Touchpads, which are not plagued with the mechanical defects and size limitations associated with mechanical buttons, enable the entry of commands via a simple finger touch, and are thus used, for example, in notebook computers instead of or in conjunction with mice or other pointing devices. In this regard, touchpads are well suited for use in small media players, such as MP3 players, or with display devices such as Liquid Crystal Display ("LCD") devices.

Small data storage devices may also include small displays on which only a limited amount of information can be displayed. Accordingly, it is useful to provide for functionality that enables a user to quickly and easily navigate to information which is not currently displayed. To this end, touchpads may be used to rapidly navigate between items shown on the display, and to locate items which are not currently displayed, such as by using a cursor acceleration function or a scrolling function.

A touchpad includes one or more sensors for detecting a user input, such as a finger touch or other input, via a capacitive sensing method, a resistive sensing method, a surface acoustic wave sensing method, an optical sensing method, a pressure sensing method, or other methods. A touchpad which uses the capacitance sensing method includes a protective shield to be touched by a user, an electrode layer disposed under the protective shield, and a controller. The electrode layer includes electrodes and generates a small electrostatic capacitance between a corresponding electrode and a protective shield that the user's finger touches. The controller includes a circuit configured to receive variations in the electrostatic capacitance from the electrode that the user's finger touches and to generate an output signal corresponding to the electrode or the location associated with the electrode. The output signal includes instructions for carrying out a function associated with that electrode or associated with the location of that electrode.

The controller is connected to and receives the electrical signal from an electrode through a port. The touchpad may include a port for each electrode, where the number of electrodes increases as the number of ports connecting the electrodes to the controller increases and as the functions associated with the touchpad increases. For example, a touchpad capable of carrying out improved functions in addition to basic functions may be equipped with a large number of electrodes which use an equally large number of ports.

The number of ports on a touchpad may be reduced without reducing or otherwise eliminating any of its functions. In particular, a new touchpad button associated with a function may be implemented without adding an additional port for the new button, for use as an input unit for data storage devices such as electronic notebooks, PDAs, electronic notepads, MP3 players, PMPs, game machines, and digital cameras.

Figure 1:
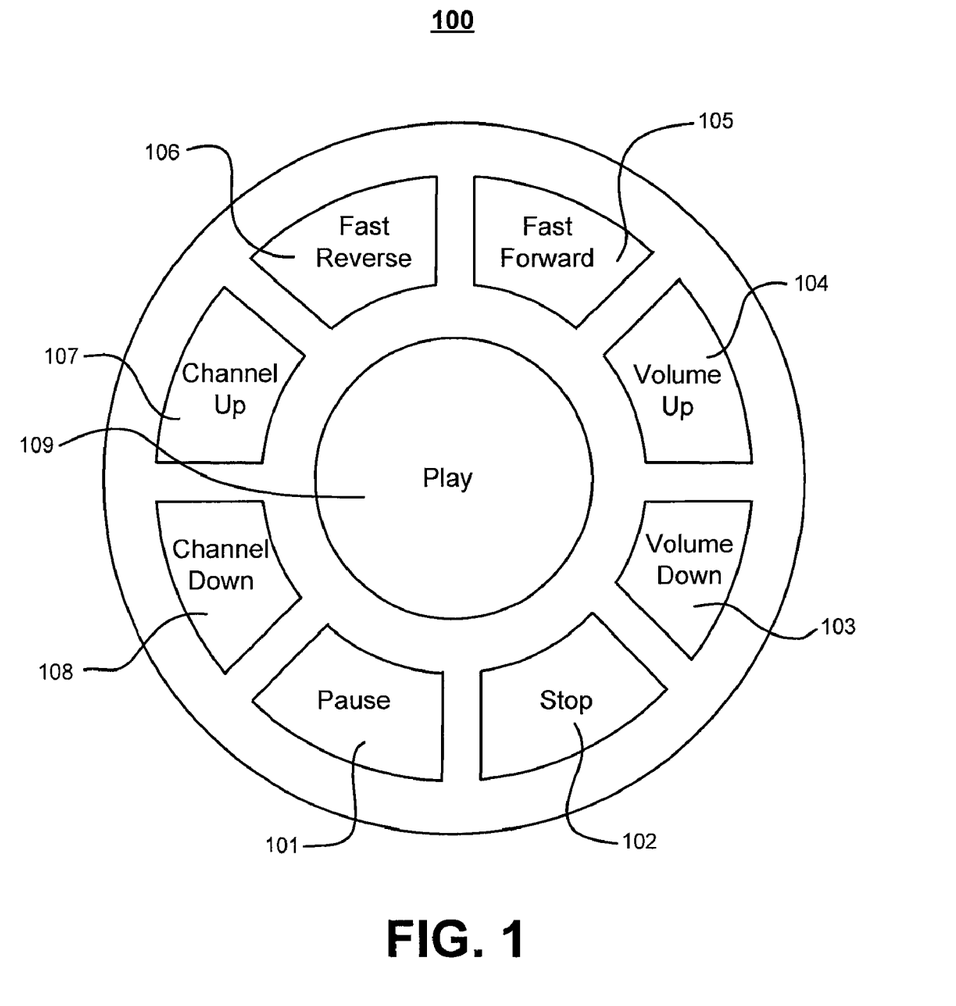
FIGS. 1 and 2 respectively depict an upper and middle surface of an exemplary touchpad.

FIG. 1 depicts an upper surface of an exemplary touchpad 100, such as a touchpad on a media player, where the upper surface of the touchpad 100 includes zones 101 to 109. The touchpad 100 may be associated with a media player that can play or otherwise output MP3 files, image files, moving image files, text files, or other data, using basic functions and improved functions. Basic functions associated with media players include menu select, movement, enter, file play, stop, fast forward ("FF"), fast reverse ("FR"), increase volume ("volume+"), and decrease volume ("volume−") functions. Improved functions may include cursor acceleration and scrolling functions for rapidly selecting and searching for items to be displayed on the media player display.

The basic functions and improved functions may be assigned to each of the zones, or some functions may be assigned to a single zone in an overlapping manner. The zones include radial zones 101 to 108 and a central zone 109, where the radial zones 101 to 108 each occupy a discrete angular region around the central zone 109, and the central zone 109 is located at the center of the touchpad and is surrounded by the radial zones 101 to 108.

A user input, such as a finger touch, of the radial zones 101 to 108 and the central zone 109 is detected via sensors which are disposed underneath the zones 101 to 109. In one implementation, each of the radial zones 101 to 108 is equipped with sensors which are spatially divided and closely disposed under the surface of the radial zones 101 to 108. The sensors may be activated by touching the upper surface of the radial zones 101 to 108, and may be used to detect direction or movement, with respect to a Cartesian or polar coordinate system.

Figure 2:
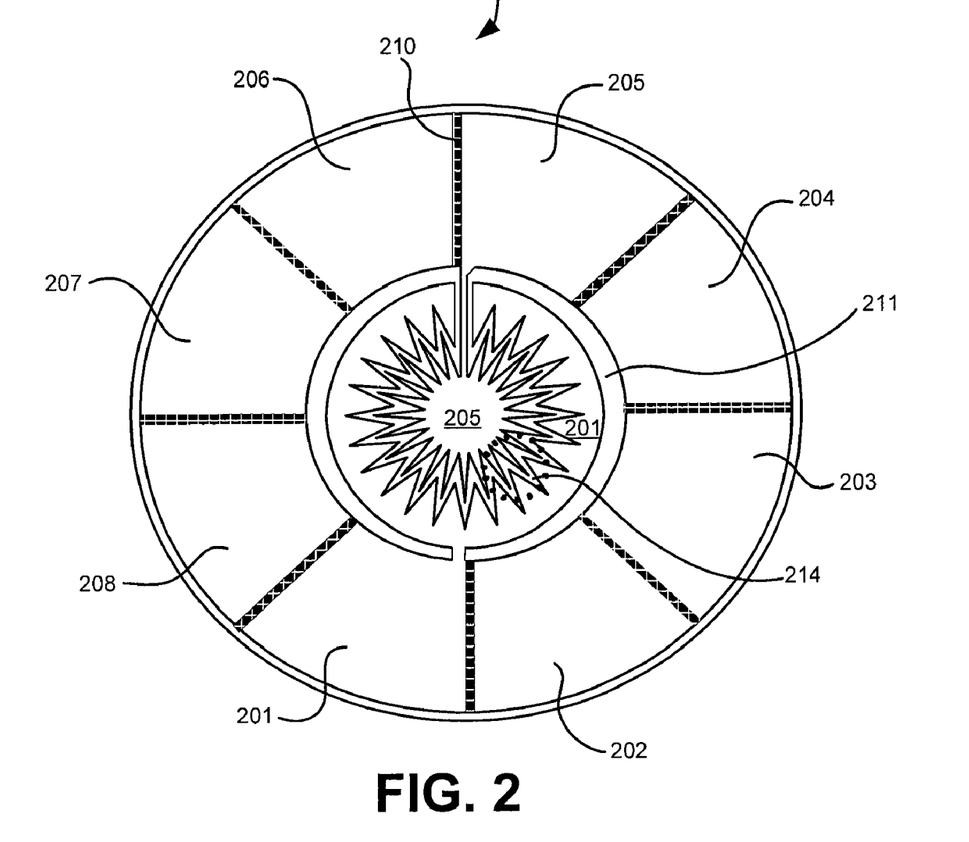

FIG. 2 depicts a middle surface of the touchpad 100. In FIG. 2, the upper surface (including zones 101 to 109) has been removed to expose sensors 201 to 208, which are each disposed underneath the radial zones 101 to 108. The sensors 201 to 208 each occupy discrete angular regions, and are separated by boundaries, such as boundary 210.

The sensors 201 to 208 are each configured to generate electrical signals in response to the user input. For example, the sensor 201, disposed under the radial zone 101, is configured to generate a first electrical signal in response to a user touching the radial zone 101. Similarly, the sensor 202, disposed under the radial zone 102, is configured to generate a second electrical signal in response to a user touching the radial zone 102. The remaining sensors 203 to 208 are disposed under the radial zones 103 to 108, respectively, and each is configured to generate an electrical signal in response to a user touching the corresponding zone. The sensors 201 to 208 may be capacitive sensors, resistive sensors, or any other type of sensor.

In contrast to the radial zones 101 to 108, which include one associated sensor, the central zone is associated with two sensors. In particular, non-overlapping portions of both sensors 201 and 205 are disposed under the central zone 109, and separated from the remaining sensors 202 to 204 and 206 to 208 by a boundary 211. In further detail, a portion of the sensor 205 extends from an area beneath radial zone 105 into a central area beneath central zone 109, and a portion of the sensor 201 extends from an area beneath radial zone 101 into an area beneath central zone 109, and surrounds the portion of the sensor 205. A boundary 214 is formed between the sensors 201 and 205 beneath central zone 109, such that sensors 201 and 205 are non-overlapping.

Figure 3:
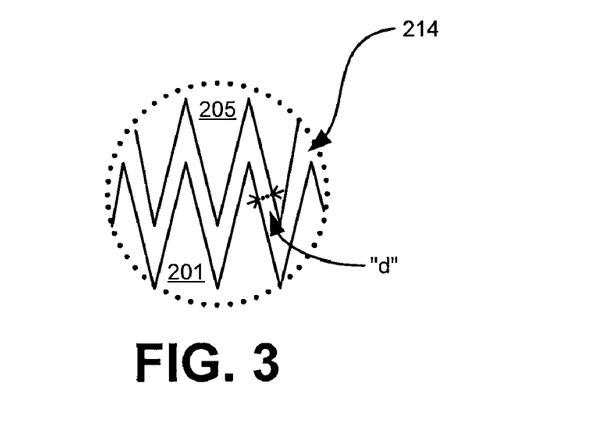
FIG. 3 is a detailed view of the boundary between non-overlapping sensors associated with the central zone of the touchpad of FIGS. 1 and 2.

FIG. 3 is a detailed view of the boundary 214 between the non-overlapping sensors 201 and 205. In various implementations, the boundary 214 has a saw-tooth pattern, a zigzag pattern, a curved pattern, or another pattern. Furthermore, the distance d between the non-overlapping sensors 201 and 205 may vary, and could be, for example, at least 0.1 millimeters, at least 0.2 millimeters, at least 0.4 millimeters, or another distance.

Figure 4:
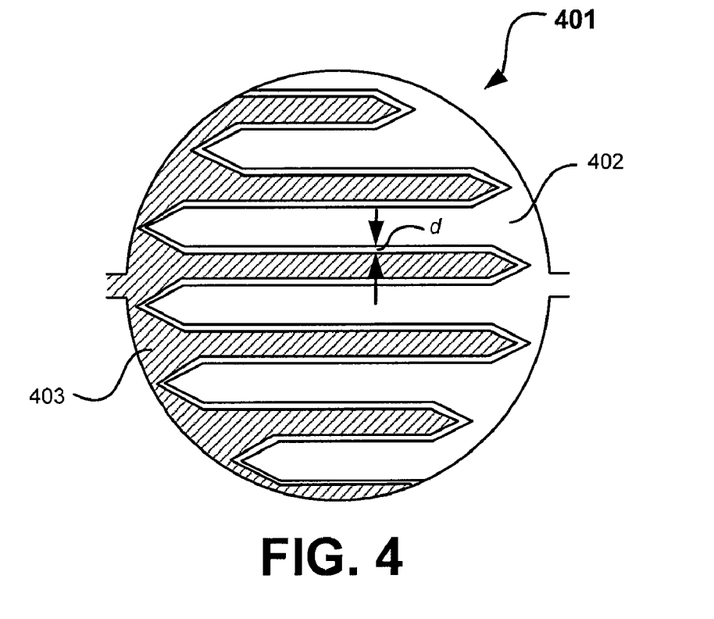
FIGS. 4 and 5 depict non-overlapping sensors that may be disposed under a single zone of an exemplary touchpad.
Figure 5:
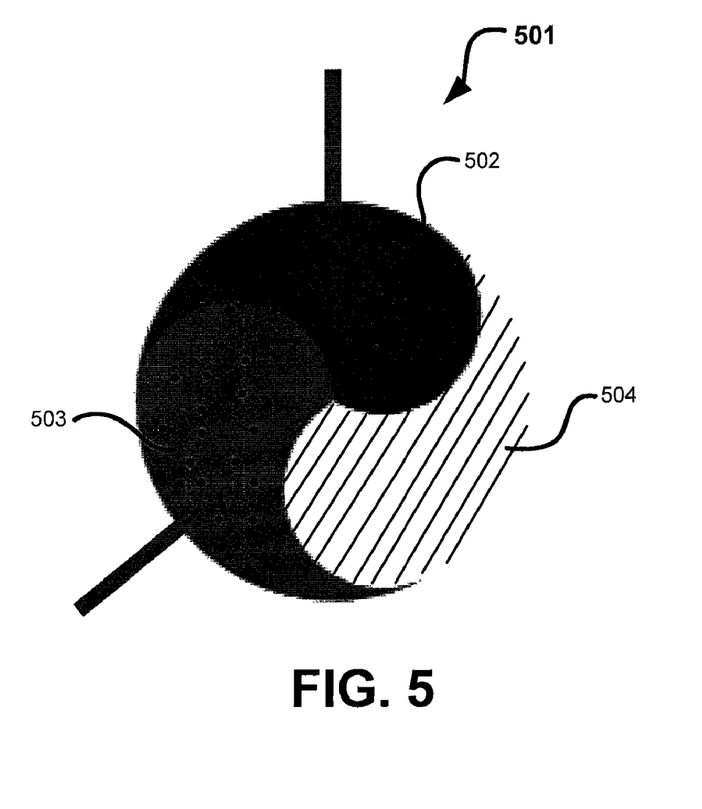

FIGS. 4 and 5 depict non-overlapping sensors disposed under a single zone 401 of an exemplary touchpad. In particular, in FIG. 4, an area beneath zone 401 is occupied by both non-overlapping sensors 402 and 403, which are oriented in a zigzag pattern with respect to each other. The sensors 402 and 403 are separated by distance d, which is sufficiently small so that a user input on any portion of the zone 401 activates both sensors 402 and 403.

Although FIG. 4 depicts a central region 401 as being occupied by two non-overlapping sensors, in another implementation more sensors may be used. For example, and as shown in FIG. 5, a zone 501 includes three sensor 501 to 503 each individually associated with different regions of the touchpad 100. As indicated above, the sensors, and the boundaries between the sensors 501 to 503 may be of various shapes. In this illustrated example, for instance, the sensors form a Yin and Yang pattern, although other patterns, such as spiral patterns, may also be formed.

Returning to FIG. 3, the saw-tooth shaped boundary 214 is distributed uniformly within the region 209, enabling the user to activate both the sensors 201 and 205 with a single finger touch, irrespective of a location within the central zone 109 that the finger actually contacts. Accordingly, if the user touches any portion of the central zone 109, both sensors 201 and 205 are activated substantially simultaneously, thereby generating an electrical signal corresponding to the central zone 109. The electrical signal is transmitted to the controller of the touchpad 100 via ports which connect the sensors 201 and 205 to the controller.

Figure 6:
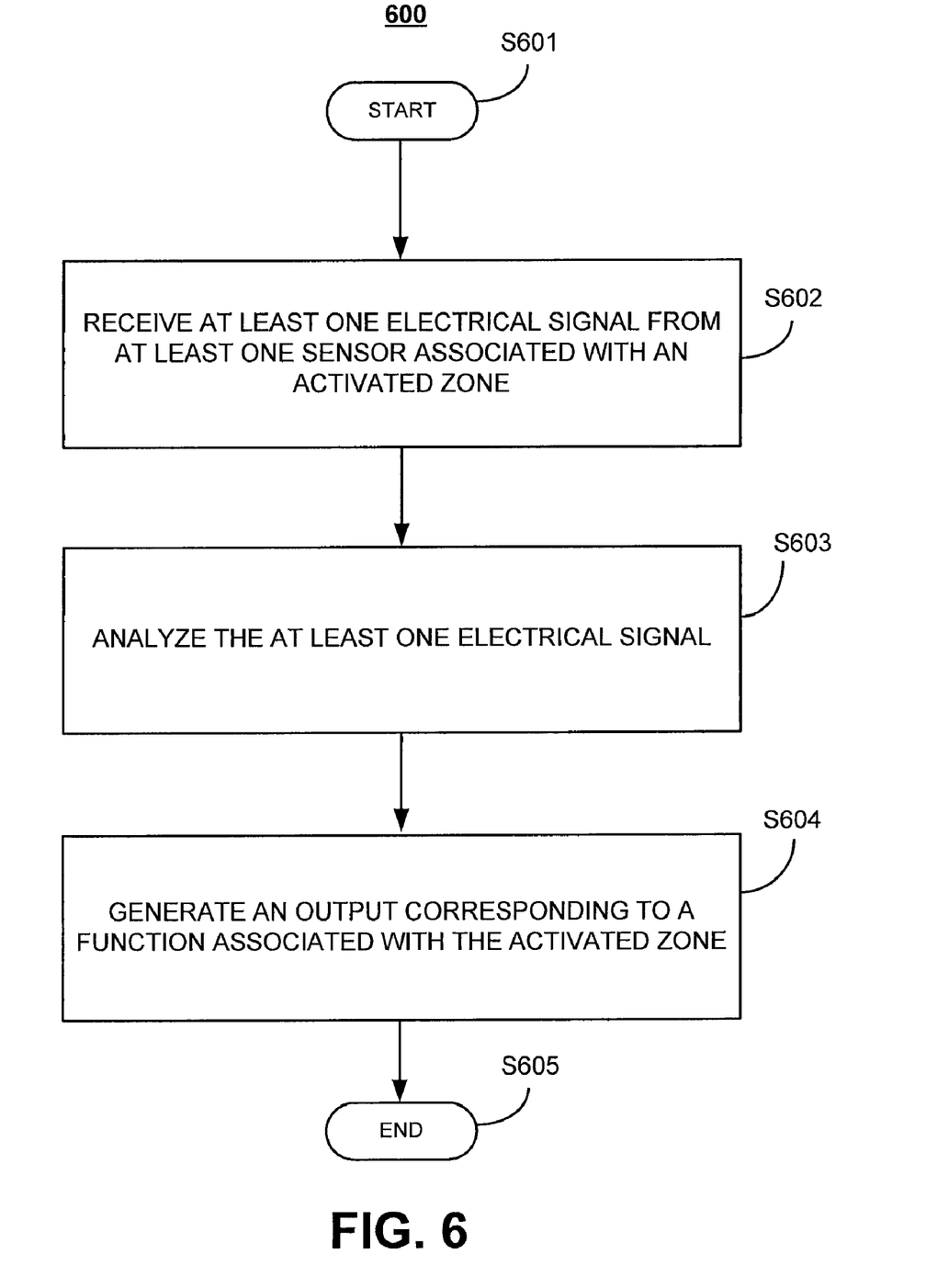
FIG. 6 is a flowchart depicting an exemplary method of operating a touchpad such as the touchpad of FIGS. 1 and 2.

The controller is configured to receive the electrical signal and generate output information corresponding to a function associated with the received electrical signal. FIG. 6 illustrates an exemplary method 600 that the controller uses to generate the output information corresponding to the function associated with the received electrical signal. When method 600 begins (S601), an electrical signal is received from at least one sensor associated with the activated zone (S602). The activated zone includes a zone that is touched by a user on its upper surface. Once the upper surface of the zone is touched by the user, the sensor or sensors lying beneath the activated zone generate an electrical signal or signals. The electrical signal or signals are transmitted to and received by the controller via a port connecting the sensor to the controller.

For example, if the radial zone 101 is activated by the user, the sensor 201 disposed under the radial zone 101 generates the electrical signal if a finger touch is detected in the radial zone 101. An electrical signal is transmitted from the sensor 201, and received by the controller via the port connecting the sensor 201 to the controller. Alternatively, if the central zone 109 is activated by the user, both the sensors 201 and 205 associated with the central zone 109 generate electrical signals, and the electrical signals are transmitted to and received by the controller via the ports connecting the sensors 201 and 205 to the controller.

The received electrical signal or signals are analyzed (S603). More particularly, the controller analyzes the electrical signal or signals to determine the command or function intended by the user, which is input by touching the upper surface over a corresponding zone. In one implementation, the controller identifies the activated function based on the distinguishing characteristic of each electrical signal. For example, the sensor 201 may generate a first electrical signal which is associated with one function, and the sensor 205 may generate a second and different electrical signal which is associated with another function. In another implementation, the controller identifies the activated function based on the port from which the electrical signal is received. For example, if the electrical signal is received from a port associated with the sensor 201, the controller identifies a first function as being activated. If the controller receives the same electrical signal from a port associated with the sensor 205, the controller identifies a second function as being activated.

As noted above, some zones may not include one signal sensor and as such may not include a single port for distinguishing the function associated with those zones. For example, the central zone 109 is not associated with a single sensor, and as such it is not associated with a single port. However, because the central zone 109 is associated with sensors 201 and 205, the controller identifies the activation of the central zone 109 if it receives electrical signals from sensors 201 and 205 substantially simultaneously.

The controller generates output information corresponding to the function associated with the activated zone (S604), and the method 600 ends (S605). The controller transmits the output information to a processor of the data storage device which carries out the function. The function to be carried out may include a basic function and/or an improved function of the media player. Referring again to FIG. 1, the basic functions and/or the improved functions may be associated with the radial zones 101 to 108 and a function for enabling a selected item may be associated with the central zone 109. If the improved functions are associated with the radial zones 101 to 108, then the basic functions may be associated with another touchpad and/or buttons. The improved function may include a scrolling function that enables selection or search for an item displayed on the screen of the media player. The scrolling function may be implemented in a variety of ways depending on the shape of the touchpad.

For example, where the sensors of the touchpad are divided in a radial direction, as shown in FIG. 2, the scrolling function may be implemented by a user's finger moving in the circumferential direction while touching the surface of the touchpad 100. As the user's finger moves in the circumferential direction while touching the surface of the touchpad 100, electrical signals are sequentially generated from consecutive activated sensors. The controller is configured to receive the generated electrical signals via ports, to analyze the signals, and to generate output information corresponding to the scrolling function. The controller transmits the output information to the media player's processor. The processor receives the information and carries out the function (e.g., moving the cursor quickly between items displayed on the media player's screen).

In one implementation, the controller may be able to distinguish between the clockwise movement and the counterclockwise movement of the user's finger on the surface of touchpad 100, and the controller may be able to assign a different function to each one of the movements. For example, the controller may scroll the page downward if the clockwise movement is detected, and the controller may scroll the page upward if the counterclockwise movement is detected.

The controller detects the direction of the user's finger movement by detecting the order in which the sensors generate electrical signals. For example, if the controller receives an electrical signal first from the sensor 201 and then from the sensor 202, the controller determines the movement is counterclockwise and generates output information corresponding to downward scrolling. Alternatively, if the controller receives an electrical signal first from the sensor 202 and then from the sensor 201, the controller determines the movement is clockwise and generates output information corresponding to upward scrolling.

Figure 7:
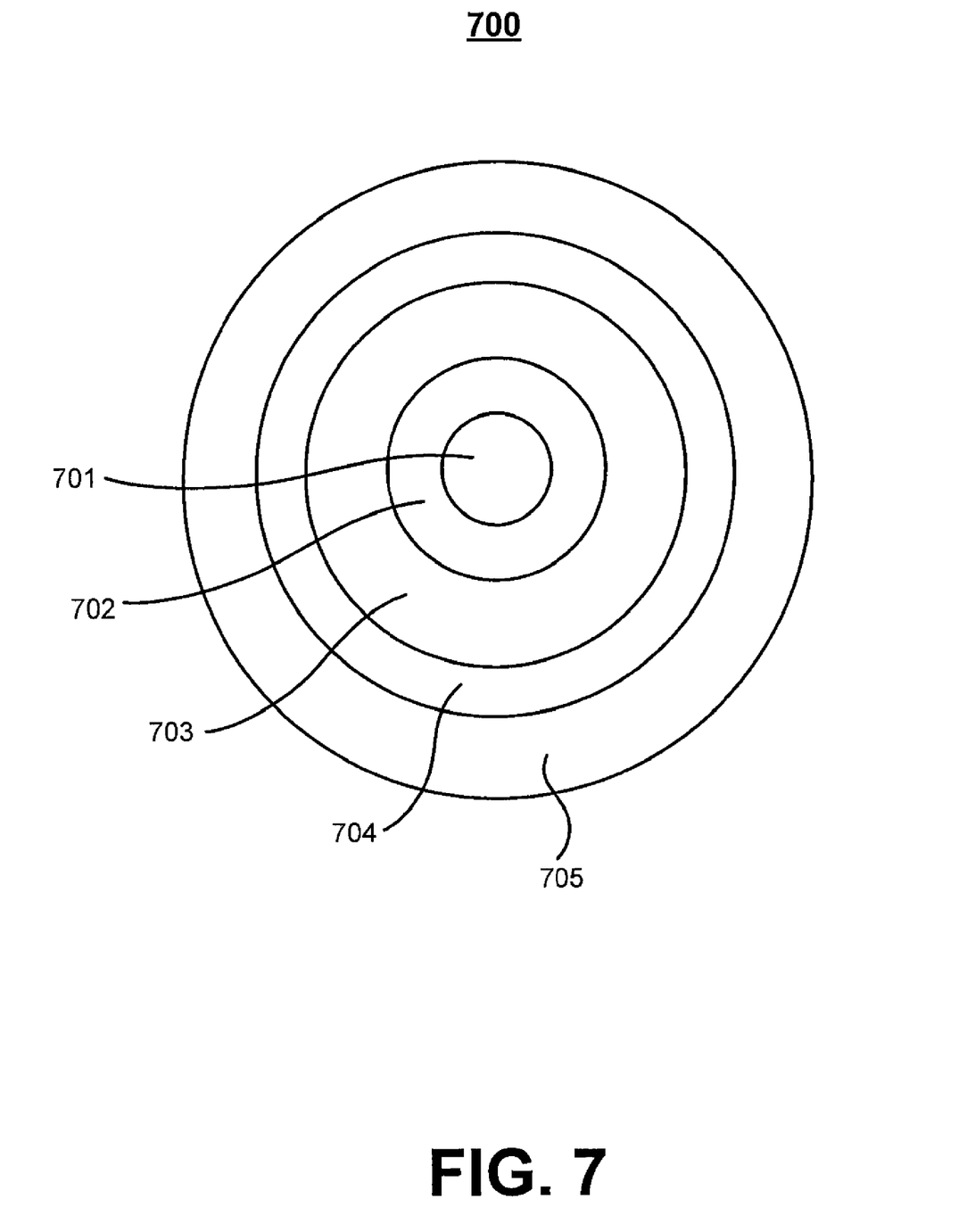
FIGS. 7 and 8 depict additional exemplary touchpads.

In another implementation, the user may activate the scrolling function by moving the user's finger in a radial direction while touching the surface of the touchpad including sensors divided in a circumferential direction. FIG. 7 illustrates an exemplary touchpad 700 that includes sensors which are divided in the circumferential direction. The touchpad 700 includes a central region 701 and circumferential sensors 703 to 705 divided in a circumferential direction. The central region 701 is separated from the circumferential sensors 703 to 705 by a boundary 702. The boundary 702 is surrounded by the circumferential sensor 703, which is surrounded by the circumferential sensor 704, which is in turn surrounded by the circumferential sensor 705. The circumferential sensors 703 to 705 are each connected to a controller via an independent port. The central region 701, similarly to the region 209 shown in FIG. 2, may include two or more sensor regions, with each region electrically connected to one of the circumferential sensors 703 to 705.

As the user's finger moves in the radial direction while touching the surface of the touchpad 700, electrical signals are sequentially generated from consecutive circumferential sensors 703 to 705. The controller is configured to receive the generated electrical signals via ports, to analyze the electrical signals, and to generate output information corresponding to the scrolling function. The controller transmits the output information to the media player's processor. The processor receives the output information and carries out the function (e.g., moving the cursor quickly between items displayed on the media player's screen).

The controller may be able to distinguish between the inward and outward radial movement of the user's finger on the surface of the touchpad 700, and the controller may be able to assign a different function to each one of the movements. For example, the controller may quickly move the cursor downward if the outward radial movement is detected, and the controller may quickly move the cursor upward if the inward radial movement is detected. The controller may use the order in which the circumferential sensors generate an electrical signal to determine the inward and/or outward radial movement of the user's finger. For example, if the controller first receives an electrical signal from the circumferential sensor 703 and then from the circumferential sensor 704, the controller determines the movement is an outward radial movement and generates output information corresponding to downward scrolling. Alternatively, if the controller first receives an electrical signal from the circumferential sensor 704 and then from the circumferential sensor 703, the controller determines the movement is an inward radial movement and generates output information corresponding to upward scrolling.

Figure 8:
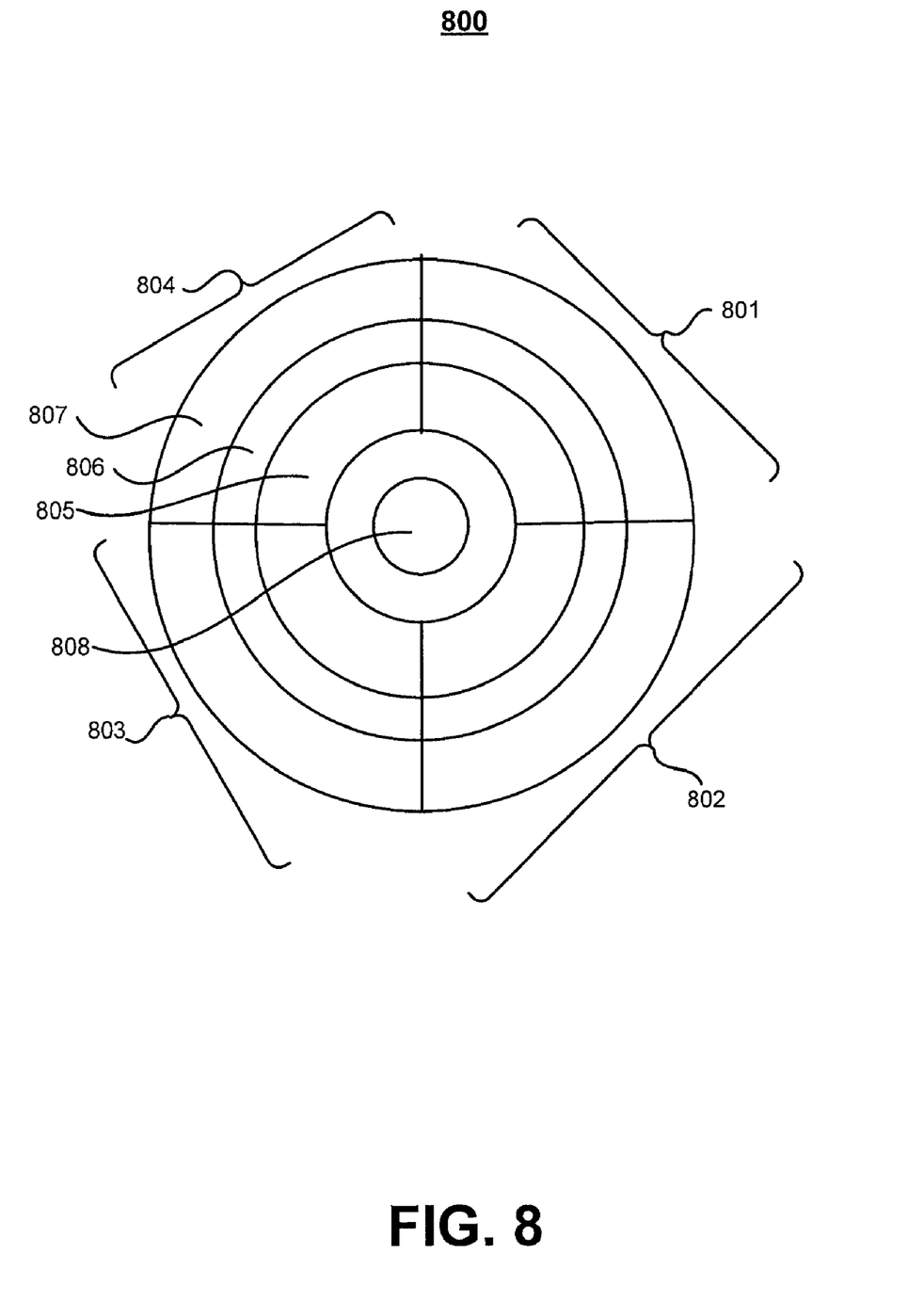

In another implementation, a touchpad may include sensors divided both in a radial direction and in a circumferential direction. FIG. 8 illustrates an exemplary touchpad 800 that includes sensors in both the radial direction and the circumferential direction. There are four radial sensor sections 801 to 804 that are each divided into three circumferential sensors. For example, the radial sensor section 804 is divided into circumferential sensors 805 to 807. The touchpad 800 also includes a central region 808. The central region 808 may include two or more sensor regions, each electrically connected to one of the circumferential sensors as described above with respect to the central zone 109 in FIG. 1.

With the touchpad 800, one improved function may be associated with the radial sensor sections 801 to 804, and another improved function may be associated with the circumferential sensors 805 to 807. For example, a function of changing the speed of playing a file that is being played may be applied to the radial sensor sections 801 to 804, and a function of changing the volume may be applied to the circumferential sensors 805 to 807. In particular, while touching the surface of the touchpad 800, if the user's finger moves in a clockwise direction, the function of quickly playing a file is activated, and if the user's finger moves in a counterclockwise direction, the function of slowly playing the file is activated. Similarly, if the user's finger moves in an outward radial direction, the function of turning up the volume may be activated, and if the user's finger moves in an inward radial direction, the function of turning down the volume may be activated. In another implementation, the function of changing the volume may be associated with the radial sensor sections 801 to 804, and the function of changing the speed of the file that is being played may be associated with the circumferential sensor sections 805 to 807. Other functions may be associated with the radial sensor sections 801 to 804 and the circumferential sensors 805 to 807.

The touchpad 800 also may include functionality to control the speed at which the cursor moves between items displayed on the media player's screen. The speed of the cursor can be controlled in proportion to the speed at which the user's finger moves while touching the surface of the touchpad 800. The controller of the touchpad 800 can detect the moving speed of the finger by detecting the number of generated signals from consecutive sensors within a unit time, and the controller can provide corresponding information to the processor of the media player.

Figure 9:
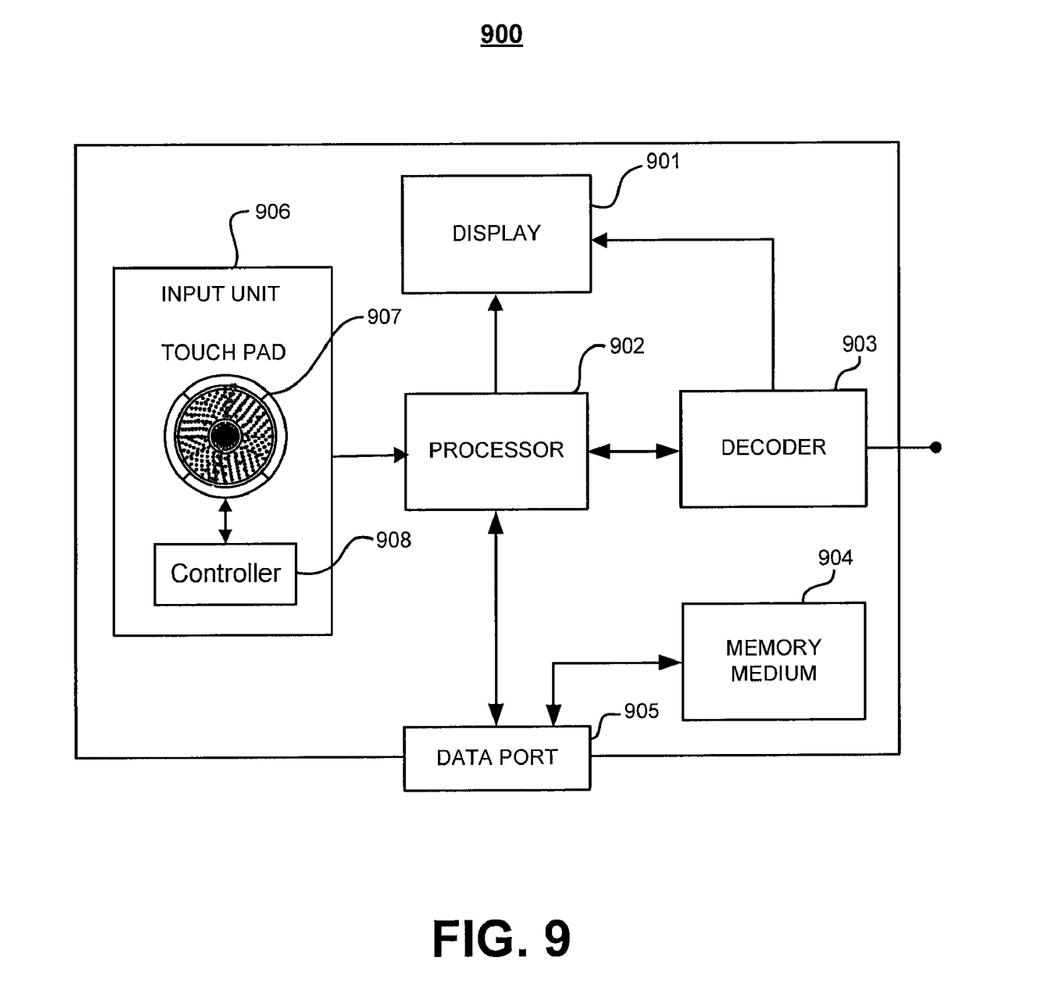
FIG. 9 is a block diagram depicting an exemplary media device including a touchpad.

FIG. 9 illustrates a block diagram of an exemplary media device and/or media player 900, including a touchpad. The media player 900 includes a display 901, a processor 902, a decoder 903, a memory medium 904, a data port 905, and an input unit 906. The display 901 includes a screen, such as an LCD or Organic Light Emitting Diode ("OLED"). The processor 902 includes a microprocessor that controls the overall operation of the media player 900. The decoder 903 decodes audio files, video files, and text files, for example, and outputs the decoded data as audio and/or video. The files may encoded in the MP3, OGG VORBIS™ MPEG-1, 2, and 4, DVIX®, or H.264 encoding standards, for example. The text files may include HTML and XML.

The memory medium 904 is used to store audio, video, text files, and/or other electronic data, and it includes a hard disk and/or a flash memory such as SANDISK®, COMPACT-FLASH™ memory, or a memory stick. The data port 905 exchanges data with a host computer through communication in accordance with specifications such as Universal Serial Bus ("USB") or the INSTITUTE OF ELECTRICAL AND ELECTRONIC ENGINEERS® ("IEEE®") 1394 standards. The media player 900 may further include a headphone jack or an audio/video jack that transmits data to be played to an external output device such as a speaker or a TV. The media player 900 also includes the input unit 906, which further includes a touchpad 907 and a controller 908.

Figure 10:
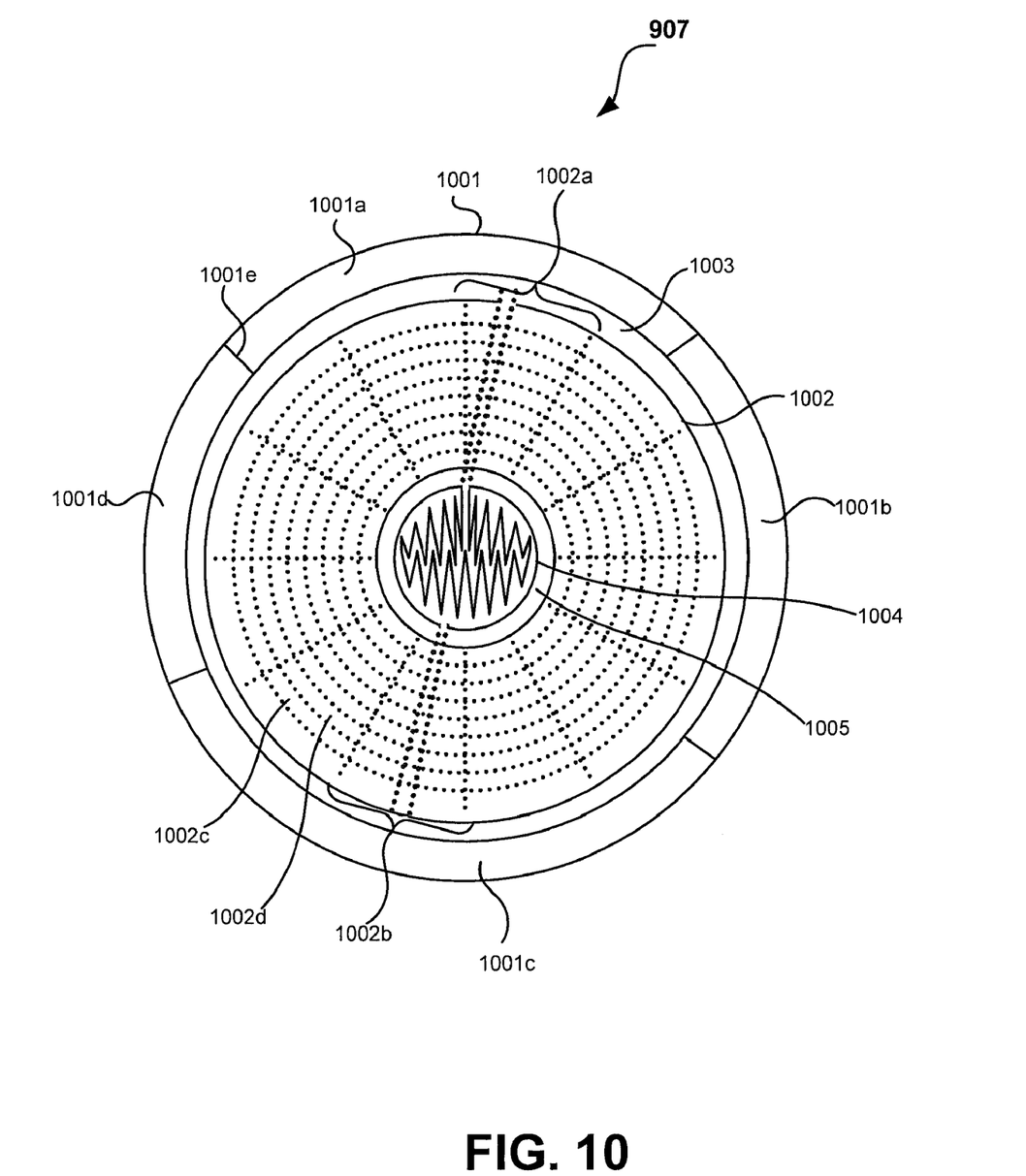
FIG. 10 is a detailed view depicting the exemplary touchpad illustrated in FIG. 9.

FIG. 10 is a detailed view depicting the touchpad 907 of input unit 906. The touchpad 907 includes an outer touchpad 1001 and an inner touchpad 1002. The outer touchpad 1001 is separated from the inner touchpad 1002 via a circular boundary 1003. The outer touchpad 1001 includes circumferential sensors 1001a to 1001d that are divided in a circumferential direction by boundaries 1001e. In one implementation, the circumferential sensors 1001a to 1001d are associated with the basic functions of the media player 900.

The inner touchpad 1002 includes radial sensor sections and/or circumferential sensors and a central region 1004. The radial sensor sections include radial sensor sections 1002a and 1002b, for example. Each radial sensor section is composed of circumferential sensors, such as circumferential sensors 1002c and 1002d, for example. In one implementation, the radial sensors and/or the circumferential sensors are associated with the improved functions, such as a cursor acceleration function of moving the cursor quickly between items displayed on the display 901 and/or a scrolling function for scrolling the information up or down within the display 901. As described above with respect to FIG. 8, the user may activate these functions by rotating the user's finger in a clockwise and/or counterclockwise direction on the upper surface of the inner touchpad 1002. Alternatively, the user can activate these functions by radially moving the user's finger in an inward and/or outward direction on the upper surface of the inner touchpad 1002.

The inner touchpad 1002 also includes the central region 1004. The central region 1004 is located at the center of the inner touchpad 1002 and is separated from the radial sensor sections (e.g., sensor sections 1002a and 1002b) and the circumferential sensors (e.g., sensors 1002c and 1002d) of the inner touchpad 1002 by a circular boundary 1005. The central region 1004 may include two sensor regions, each electrically connected to one of the circumferential sensors of the inner touchpad 1001. Alternatively, the two sensor regions of the central region 1004 may be electrically connected to other non-adjacent circumferential sensors of the inner touchpad 1002. In yet another implementation, the two sensor regions of the central region 1004 may be electrically connected to non-adjacent circumferential sensors of the outer touchpad 1001.

The controller 908 detects input from the user through the sensors of the outer touchpad 1001 and/or the inner touchpad 1002, analyzes the input, and transmits corresponding information to the processor 902. For example, when the user touches the upper surface of the outer touchpad 1001, the controller receives an electrical signal from at least one of the circumferential sensors 1001a to 1001d. The controller analyzes the received electrical signal to identify the function associated with the activated circumferential sensor. Upon identification of the function, the controller 908 generates output information corresponding to the function and transmits the output information to the processor 902. The function may be one of the basic functions associated with the media player 900.

Similarly, when the user touches the upper surface of the inner touchpad 1002, the controller receives an electrical signal from one or more of the circumferential sensors. For example, if the user moves his finger in a circumferential direction while touching the upper surface of the inner touchpad 1002, the controller 908 receives multiple sequentially generated signals from the activated circumferential sensors. The controller 908 analyzes the sequentially generated signals to identify the corresponding function. Upon identifying the function associated with the activated sensors, the controller 908 generates output information corresponding to the function and transmits the output information to the processor 902. For another example, if the user touches the upper surface of the central region 1004, the controller 908 concurrently receives multiple signals from the two non-adjacent sensors that are connected to the central region 1004. The controller 908 analyzes the concurrently received signals, determines that the central region 1004 is activated, and generates output information corresponding to the central region 1004. The controller 908 transmits the output information to the processor 902, which carries out the activated function.

In one example, the function associated with the activated sensors may correspond to a scrolling function. To carry out the scrolling function, the controller 908 also analyzes the signal to identify the direction of the user's finger movement on the surface of the inner touchpad 1004 to determine whether to scroll the window up or down. Additionally, the controller 908 may analyze the speed of the finger's movement to determine how fast to scroll the window up or down. Based on this information, the controller 908 generates output information corresponding to the scrolling function and transmits the output information to the processor 902. The processor 902 controls the display 901, the decoder 903, and the memory medium 904 based on the output information received from the controller 908, thereby performing a desired function.

Other implementations are within the scope of the following claims. For example, referring again to FIG. 2, although the touchpad 100 is shown as including eight radial sensors 101 to 108, the touchpad 100 may be configured to include more sensors. In addition, the central region 109, which includes two sensor regions, may appear at a location other than the center of the touchpad 100. In another implementation, the touchpad has a square shape or an elliptical shape.

Figure 11:
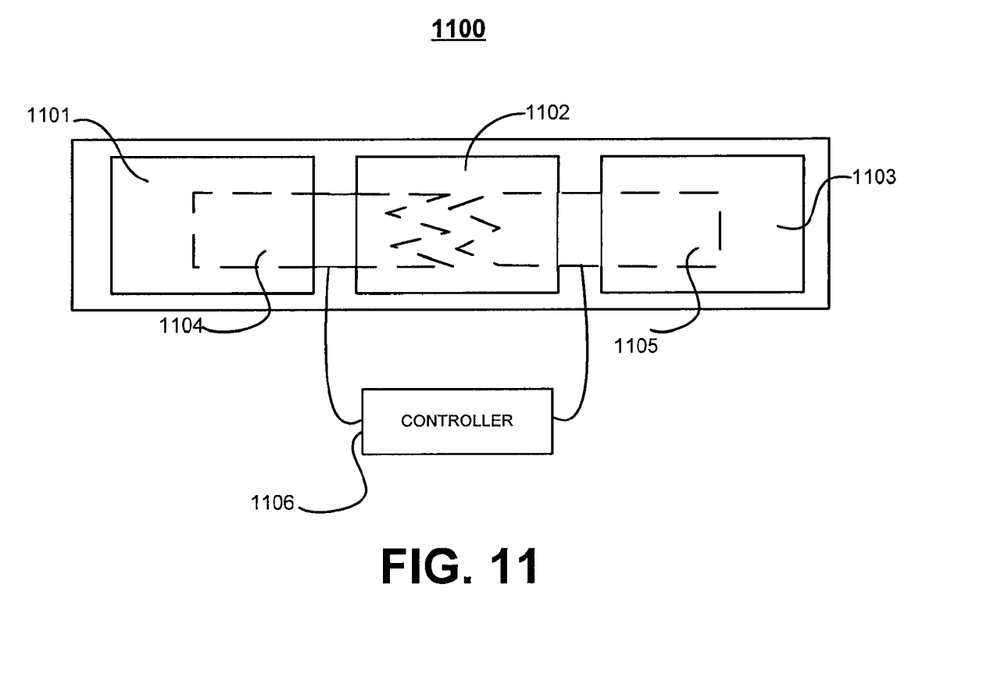
FIG. 11 depicts another exemplary touchpad.

FIG. 11 illustrates an exemplary rectangular touchpad 1100. Briefly, the touchpad 1100 includes first through third zones, where the first zone and the third zone are not adjacent. The touchpad 1100 includes at least first and second non-overlapping sensors. The first sensor is disposed in at least a portion of the first and the second zones and is configured to transmit a first electrical signal in response to a user input. The second sensor is disposed in at least a portion of the second and the third zones and is configured to transmit a second electrical signal in response to a user input. The touchpad 1100 also includes a controller configured to generate first information in response to receiving the first electrical signal but not the second electrical signal. The controller also is configured to generate second information in response to receiving both the first electrical signal and the second electrical signal, and third information in response to receiving the second electrical signal but not the first electrical signal.

In more detail, the touchpad 1100 includes a first zone 1101, a second zone 1102, a third zone 1103, a first sensor 1104, and a second sensor 1105. The first zone 1101 and the third zone 1103 are non-adjacent, and are, in this example, separated by the second zone 1102. The first sensor 1104 is disposed under the first zone 1101 and a portion of the second zone 1102. The second sensor 1105 is disposed under the third zone 1103 and a portion of the second zone 1102. Under the layer of third zone 1102, the first sensor 1104 and the second sensor 1104 are separated from each other by a saw-tooth shaped boundary. The first sensor 1104 and the second sensor 1105 are each configured to generate an electrical signal when their respective zone is activated. For example, if the user touches the first zone 1101, the sensor 1104 generates a first electrical signal. If the user touches the third zone 1103, the second sensor 1105 generates a second, different, electrical signal. And, if the user touches the second zone 1102, both the first and second sensors 1104 and 1105 concurrently generate the first and the second electrical signals.

The touchpad 1100 also includes a controller 1106 that is configured to generate information in response to receiving the electrical signal from the sensors 1104 and 1105. In particular, the controller is also configured to generate first information in response to receiving the first electrical signal but not the second electrical signal (e.g., in response to activation of the first zone 1101). The controller also is configured to generate second information in response to receiving both the first electrical signal and the second electrical signal (e.g., in response to the activation of the second zone 1102), and to generate third information in response to receiving the second electrical signal but not the first electrical signal (e.g., in response to the activation of the third zone 1103). Each of the first, second, and third information corresponds to a function associated with the first, second, or third zone 1101 to 1103, respectively. For example, the functions may include basic functions and/or improved functions of a media player described above with respect to FIG. 1.

Figure 12:
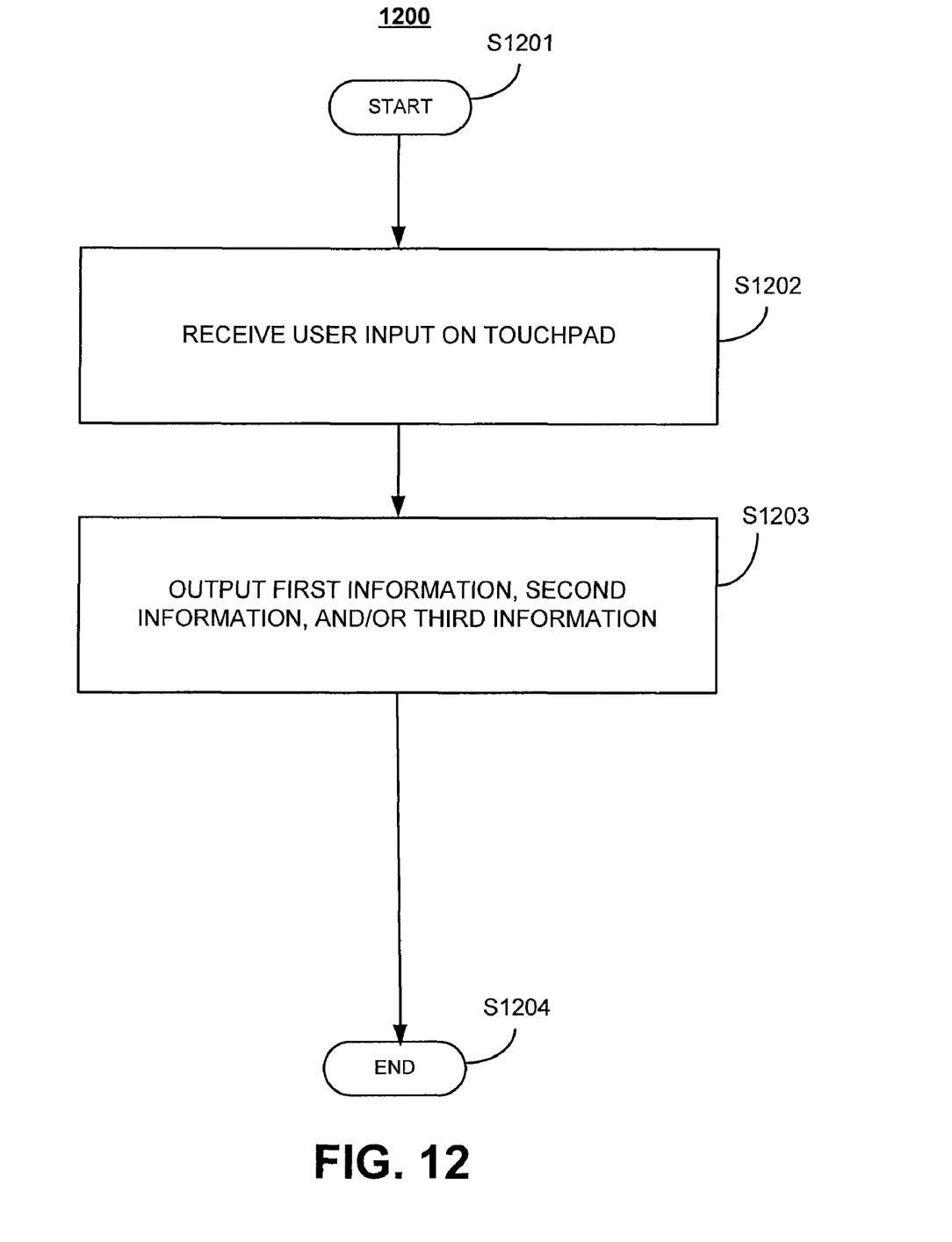
FIG. 12 is a flowchart depicting another exemplary method of using a touchpad.

FIG. 12 is a flowchart depicting another exemplary method 1200. Briefly, the method 1200 includes receiving a user input on a touchpad that includes at least first through third zones, with the first zone and the third zone being not adjacent. The touchpad further includes at least first and second non-overlapping sensors, with the first sensor disposed in at least a portion of the first and the second zones and configured to transmit a first electrical signal in response to a user input, and the second sensor disposed in at least a portion of the first and the third zones and configured to transmit a second electrical signal in response to the user input. Moreover, the touchpad includes a controller configured to generate first information in response to receiving the first electrical signal but not the second electrical signal, second information in response to receiving both the first electrical signal and the second electrical signal, and third information in response to receiving the second electrical signal but not the first electrical signal. The method further includes outputting the first information, the second information, and/or the third information.

In more detail, when method 1200 begins (S1201), a user input is received on a touchpad that includes at least first through third zones, with the first zone and the third zone being not adjacent (S1202). The touchpad further includes at least first and second non-overlapping sensors, with the first sensor disposed in at least a portion of the first and the second zones and configured to transmit a first electrical signal in response to a user input, and the second sensor disposed in at least a portion of the first and the third zones and configured to transmit a second electrical signal in response to the user input. Moreover, the touchpad includes a controller config- ured to generate first information in response to receiving the first electrical signal but not the second electrical signal, second information in response to receiving both the first electrical signal and the second electrical signal, and third information in response to receiving the second electrical signal but not the first electrical signal. The first information, the second information, and/or the third information are output (S1203), and the method 1200 ends (S1204).

The first zone and the second zone or the second zone and the third zone may be adjacent. The first and the second non-overlapping sensors may be capacitive sensors or resistive sensors. The first zone, the second zone, and the third zone may be associated with a media player function. The first, second, or third electrical signal may be indicative of a Cartesian coordinate system movement or a polar coordinate system movement. The first sensor and the second sensor may be separated by a boundary in the second zone, where the boundary may be a saw-tooth shaped boundary at least 0.2 millimeters wide. The device may further include fourth through seventeenth zones. The touchpad may be round, square, or elliptical, and the second zone may be in a center region of the touchpad. The first information may correspond to a function associated with the first zone, the second information may correspond to a function associated with the second zone, and the third information may correspond to a function associated with the third zone. The user input may include a finger touch.

The arrangements have been described with particular illustrative implementations. It is to be understood that the concepts and implementations are not however limited to the above-described implementations and that various changes and modifications may be made.

What is claimed is:

1. A device comprising:
   a touchpad including at least first through third zones, the first zone and the third zone being non-adjacent;
   at least first and second non-overlapping sensors, with the first sensor disposed in at least a portion of the first and the second zones and configured to transmit a first electrical signal in response to a user input, the second sensor disposed in at least a portion of the second and the third zones and configured to transmit a second electrical signal in response to a user input, and a boundary separating the first and second sensors in the second zone; and
   a controller configured to generate:
      first information in response to receiving the first electrical signal but not the second electrical signal,
      second information in response to receiving both the first electrical signal and the second electrical signal, and
      third information in response to receiving the second electrical signal but not the first electrical signal,
   wherein the first and second sensors are oriented such that each of the first sensor and the second sensor are intersected by a first linear axis, which is perpendicular to a second linear axis that intersects each of a centroid of the first sensor and a centroid of the second sensor.

2. The device of claim 1, wherein the first zone and the second zone are adjacent.

3. The device of claim 1, wherein the first and the second non-overlapping sensors are capacitive sensors.

4. The device of claim 1, wherein the first and the second non-overlapping sensors are resistive sensors.

5. The device of claim 1, wherein the first zone, the second zone, and the third zone are associated with a media player function.

6. The device of claim 5, wherein the first, second, or third electrical signal is indicative of a Cartesian coordinate system movement.

7. The device of claim 5, wherein the first, second, or third electrical signal is indicative of a polar coordinate system movement.

8. The device of claim 1, wherein the boundary is a saw-tooth shaped boundary.

9. The device of claim 1, wherein the boundary is at least 0.2 millimeters wide.

10. The device of claim 1, wherein the second zone is in a center region of the touchpad.

11. The device of claim 1, wherein the first information corresponds to a function associated with the first zone.

12. The device of claim 1, wherein the second information corresponds to a function associated with the second zone.

13. The device of claim 1, wherein the third information corresponds to a function associated with the third zone.

14. The device of claim 1, wherein the user input includes a finger touch.

15. The device of claim 1 wherein the first and second sensors are oriented such that at least one of the first sensor and the second sensor is intersected by the first linear axis more than once.

16. A device comprising:
a touchpad having a circular shape and including a center zone and at least first through fourth zones formed around the center zone, with the first zone and the second zone being non-adjacent;
at least first and second non-overlapping sensors, with the first sensor being disposed in at least a portion of the first zone and the center zone and configured to transmit a first electrical signal in response to a user input, and the second sensor being disposed in at least a portion of the second zone and the center zone and configured to transmit a second electrical signal in response to a user input; and
a controller configured to detect the user input and to generate:
first information in response to receiving the first electrical signal but not the second electrical signal,
second information in response to receiving both the first electrical signal and the second electrical signal, and
third information in response to receiving the second electrical signal but not the first electrical signal.

17. The device of claim 16 wherein the touchpad is further surrounded by an outer touchpad having a circular shape, and the outer touchpad includes at least fifth through eight zones, wherein the fifth and sixth zones are non-adjacent.

18. The device of claim 17 further comprising third and fourth non-overlapping sensors, with the third sensor being disposed in at least a portion of the fifth zone and the center zone and configured to transmit a third electrical signal in response to the user input, and the fourth sensor being disposed in at least a portion of the sixth zone and the center zone and configured to transmit a fourth electrical signal in response to the user input.

19. The device of claim 18, wherein the controller is further configured to generate:
fourth information in response to receiving the third electrical signal but not the fourth electrical signal,
fifth information in response to receiving both the third electrical signal and the fourth electrical signal, and
sixth information in response to receiving the fourth electrical signal but not the third electrical signal.

20. The device of claim 18, wherein the first sensor and the second sensor are separated by a boundary in the center zone and the third sensor and the fourth sensor are separated by the boundary in the center zone.

21. The device of claim 20, wherein the boundary is a saw-tooth shaped boundary.

22. The device of claim 17, wherein the third zone and the fourth zone are associated with a media player function.

23. The device of claim 16, wherein the first zone and the second zone are based on a polar coordinate system and include radial input areas for processing input from a radial motion of the user input.

24. The device of claim 16, wherein the first zone and the second zone are based on a polar coordinate system and include angular input areas for processing input from a swirl motion of the user input.

25. The device of claim 16, wherein the first zone and the second zone are associated with a cursor acceleration or scrolling function.

26. The device of claim 25, wherein the user input includes rotation of an input tool on a surface of the first touchpad in a clockwise or a counterclockwise direction.

27. The device of claim 25, wherein the user input includes a finger touch.

28. The device of claim 16, wherein the first information is a menu manipulation signal.

29. The device of claim 16, wherein the first information is a navigation signal.

30. The device of claim 16, wherein the first information is an audio signal.

31. The device of claim 16, wherein the central zone is a button which is part of the touchpad and indistinct from the touchpad.

32. A method comprising:
receiving a user input on a touchpad, the touchpad including:
at least first through third zones, with the first zone and the third zone being non-adjacent,
at least first and second non-overlapping sensors, with the first sensor disposed in at least a portion of the first and the second zones and configured to transmit a first electrical signal in response to a user input, the second sensor disposed in at least a portion of the first and the third zones and configured to transmit a second electrical signal in response to the user input, and a boundary separating the first and second sensors in the second zone, and
a controller configured to generate:
first information in response to receiving the first electrical signal but not the second electrical signal,
second information in response to receiving both the first electrical signal and the second electrical signal, and
third information in response to receiving the second electrical signal but not the first electrical signal,
wherein the first and second sensors are oriented such that each of the first sensor and the second sensor are intersected by a first linear axis, which is perpendicular to a second linear axis that intersects each of a centroid of the first sensor and a centroid of the second sensor; and
outputting the first information, the second information, and/or the third information.

33. A device comprising:
a touchpad including a center zone and at least first through fourth zones positioned around the center zone, with the first zone and the second zone being non-adjacent;

at least first and second non-overlapping sensors, with the first sensor being disposed in at least a portion of the first zone and the center zone and configured to transmit a first electrical signal in response to a user input, and the second sensor being disposed in at least a portion of the second zone and the center zone and configured to transmit a second electrical signal in response to a user input; and a controller configured to detect the user input and to generate differing information signals based on whether the first electrical signal, the second electrical signal, or the first and the second electrical signals are received.

34. The device of claim 33, wherein the touchpad has a circular shape.

35. The device of claim 33, wherein the controller is further configured to generate:
first information in response to receiving the first electrical signal but not the second electrical signal,
second information in response to receiving both the first electrical signal and the second electrical signal, and
third information in response to receiving the second electrical signal but not the first electrical signal.

* * * * *